US009877489B2

(12) United States Patent
Cucci (10) Patent No.: US 9,877,489 B2
(45) Date of Patent: Jan. 30, 2018

(54) ROLLER BOARD ASSEMBLY (76) Inventor: Jennifer Cucci, Surprise, AZ (US)

( * ) Notice: Subject to any disclaimer, the term of this patent is extended or adjusted under 35 U.S.C. 154(b) by 1396 days.

(21) Appl. No.: 13/040,388

(22) Filed: Mar. 4, 2011

(65) Prior Publication Data
US 2012/0222987 A1 Sep. 6, 2012

(51) Int. Cl.
B28B 1/00 (2006.01)
A23G 3/02 (2006.01)
A21D 6/00 (2006.01)
A21C 11/00 (2006.01)
A21C 7/02 (2006.01)
A21C 9/00 (2006.01)

(52) U.S. Cl.
CPC .......... *A21C 11/00* (2013.01); *A21C 7/02* (2013.01); *A21C 9/00* (2013.01); *Y10T 29/49826* (2015.01)

(58) Field of Classification Search
CPC ..... A21C 11/00; A21C 11/002; A21C 11/004; A21C 11/006; A21C 11/008; Y10T 29/49826; B28B 1/00; A21D 6/00; A23G 3/02
USPC .......... 99/380–382, 426–433, 439–441, 537; 425/332, 333; 249/92; 206/526; 29/428; 426/496, 503, 512
See application file for complete search history.

(56) References Cited

U.S. PATENT DOCUMENTS

| 33,136 | A |  | 8/1861 | Exton |  |
|---|---|---|---|---|---|
| 244,030 | A |  | 7/1881 | Bing |  |
| 432,127 | A |  | 7/1890 | Dyke |  |
| 1,475,316 | A |  | 7/1922 | Randall |  |
| 1,425,015 | A |  | 8/1922 | Hyten |  |
| 2,134,026 | A | * | 10/1938 | Brooks | 426/275 |
| 2,288,908 | A |  | 7/1941 | Kretchman |  |
| 2,293,109 | A |  | 8/1942 | Bridge |  |
| 3,299,835 | A |  | 1/1967 | Marsili |  |
| 3,727,508 | A |  | 4/1973 | Haapala |  |
| 4,216,763 | A | * | 8/1980 | Miklas | 126/275 R |

(Continued)

FOREIGN PATENT DOCUMENTS

| BE | 549356 | 7/1956 |
|---|---|---|
| DE | 36678 | 11/1885 |

(Continued)

OTHER PUBLICATIONS http://www.pastrychef.com/MARZIPAN-ROLLERBOARD_p_1073.html Author: Pastry Chef Central; Title Date: Apr. 13, 2009; Publisher: Pastry Chef Central.*

(Continued)

*Primary Examiner* — Michael Hoang
(74) *Attorney, Agent, or Firm* — IPTechLaw (57) ABSTRACT Roller board assemblies and methods of manufacture and use. A roller board assembly may include a roller board having a first roller board insert which is removably coupled to a housing and a second roller board insert which is also removably coupled to a housing. The removability of the first and second roller board inserts may allow for variation in the desired roller board insert configuration such as shape and size of grooves in the roller board, thus allowing for variation in the shape and size of the item to be rolled. A first coupler may couple the first roller board to the housing through a hole in the housing. A handle on the housing may allow a user to grip the housing and apply the motion required to roll an item.

20 Claims, 4 Drawing Sheets

(56) References Cited

U.S. PATENT DOCUMENTS

| | | | | |
|---|---|---|---|---|
| 4,437,826 A | * | 3/1984 | Tezuka | 425/182 |
| 4,516,923 A | * | 5/1985 | Lifshitz et al. | 425/289 |
| 4,604,947 A | * | 8/1986 | Pavan | 99/353 |
| 4,790,740 A | * | 12/1988 | Pearlman | 425/396 |
| 4,862,793 A | * | 9/1989 | Steiner | 99/430 |
| 4,984,978 A | | 1/1991 | Beatty | |
| D337,030 S | | 7/1993 | Amaral | |
| 5,499,575 A | | 3/1996 | Handel et al. | |
| 6,224,365 B1 | * | 5/2001 | Ou-Young | 425/332 |
| 6,761,108 B1 | | 7/2004 | Dreano | |
| 6,843,167 B1 | | 1/2005 | Kanafani et al. | |
| 7,065,880 B2 | | 6/2006 | Howman et al. | |
| 7,213,508 B2 | * | 5/2007 | Staton | 99/353 |
| 7,748,305 B2 | | 7/2010 | Strenio et al. | |
| 7,850,440 B2 | | 12/2010 | Alvidrez | |
| 2003/0035862 A1 | | 2/2003 | Kostival | |
| 2003/0072836 A1 | | 4/2003 | Lee | |
| 2004/0055475 A1 | | 3/2004 | Canicas | |
| 2004/0212117 A1 | | 10/2004 | Lee | |
| 2007/0137500 A1 | * | 6/2007 | Ok et al. | 99/426 |
| 2012/0219693 A1 | | 8/2012 | Juravic et al. | |

FOREIGN PATENT DOCUMENTS

| | | | |
|---|---|---|---|
| DE | 36678 | * | 9/1886 |
| DE | 273153 | | 2/1913 |
| DE | 801260 | | 12/1950 |
| EP | 0259046 | | 3/1988 |
| FR | 345707 | | 12/1904 |
| FR | 426755 | | 7/1911 |
| FR | 973957 | | 2/1951 |
| FR | 1485102 | | 6/1967 |
| WO | WO2001072133 | | 10/2001 |
| WO | WO2007080436 | | 7/2007 |

OTHER PUBLICATIONS http://web.archive.org/web/20090413172052/http://www.pastrychef.com/MARZIPAN-ROLLERBOARD_p_1073.html (wayback machine hyperlink for Apr. 13, 2009 Snapshot Capture).*
OralGermantoEnglishtranslationofGermanPatentNo.36678 (attached as pdf file).*
http://www.merriam-webster.com/dictionary/transparent (defintion of transparent).*
"Gardner Rollaball Longbase Boilie Maker" for sale on bristolangling.com website, available at http://www.bristolangling.com/gardner-rollaball-longbase-boilie-maker.html, website last visited Dec. 30, 2011.
"Fimo Roller—Basic Bead Machine" for sale on ejrbeads.co.uk website, available at http://www.ejrbeads.co.uk/shop/index.php?main_page=product_info&cPath=93_45&products_id=1140&zenid=atrqjvb0abrghh38gsrvbllja7, website last visited Dec. 30, 2011.
Marzipan Rollerboard Advertisement, available at http://www.pastrychef.com/MARZIPAN-ROLLERBOARD_p_1073.html, last visited Mar. 3, 2011.

* cited by examiner

ROLLER BOARD ASSEMBLY

BACKGROUND

1. Technical Field

Aspects of this document relate generally to instruments used for the formation of comestibles into desired shapes. More specific implementations involve instruments used to form relatively plastic comestibles, such as dough, batter, mix, paste, and so forth, into desired shapes.

2. Background Art

Various instruments exist to form comestibles into desired shapes. Some of these require manual assistance and some are largely automated. Examples of such instruments include those adapted to transport and shape foods such as spoons and ladles and those adapted to produce a shape out of a particular food, such as a cookie cutter. Many are configured to form the food into a desired shape before the food is cooked or otherwise finished in its preparation.

SUMMARY

Implementations of roller board assemblies may include: a roller board having a first roller board insert and a second roller board insert, the first roller board insert and second roller board insert each having a plurality of grooves, the plurality of grooves of the first roller board and the plurality of grooves of the second roller board aligned parallel with and facing each other wherein the roller board is configured to removably couple within a housing and the housing is configured to receive a first face of the first roller board insert on a first side of the housing and to receive a first face of the second roller board insert on a second side of the housing; and at least one coupler configured to couple the roller board to the housing through an opening in the housing.

Implementations of roller board assemblies may include one, all, or any of the following:

The cross section of each of the plurality of grooves taken perpendicular to the plurality of grooves may include a half circle.

The cross section of each of the plurality of grooves taken perpendicular to the plurality of grooves may have half of an oval shape.

The cross section of each of the plurality of grooves taken perpendicular to the plurality of grooves may have half of a pear shape.

The cross section of each of the plurality of grooves taken perpendicular to the plurality of grooves may include a half square.

The cross section of each of the plurality of grooves taken perpendicular to the plurality of grooves may have half of a cupcake shape.

Implementations of roller board assemblies may include: a first roller board having a plurality of grooves on a bottom face of the first roller board; a first housing configured to receive a top face of the first roller board, the top face of the first roller board located on a side of the first roller board opposing the bottom face; a first coupler configured to removably couple the first roller board to the first housing through an opening in the first housing; a second roller board having a plurality of grooves on a top face of the second roller board; a second housing coupled to the first housing and configured to receive a bottom face of the second roller board, the bottom face of the second roller board located on a side of the second roller board opposing the top face; and a second coupler configured to removably couple the second roller board to the second housing through an opening in the second housing.

Implementations of roller board assemblies may include one, all, or any of the following:

The first housing may include one or more handles on a top face of the first housing.

The first housing may have a first lip configured to engage with a perimeter of the first roller board, the first lip located along a perimeter of the first housing and the first lip facing the first roller board.

The second housing may have a second lip configured to engage with a perimeter of the second roller board, the second lip located along a perimeter of the second housing and the second lip facing the second roller board.

The first coupler may include a knob and screw inserted into the opening in the first housing.

The second coupler may include a knob and screw inserted into the opening in the second housing.

Each groove of the first roller board and second roller board may have a shape of a semicircle having a radius of about 1.25 inch.

Each groove of the first roller board and second roller board may have a shape of one half of the cross section of a cupcake shape.

Each groove of the first roller board and second roller board may have a shape of a semicircle having a radius of about 0.875 inch.

Each groove of the first roller board and second roller board may have a shape of one half of the cross section of an oval shape.

Each groove of the first roller board and second roller board may have a shape of one half of the cross section of a pear shape.

Each groove of the first roller board and second roller board may have a shape of one half of a square.

Implementations of methods of manufacture for roller board assemblies may include: forming a first roller board having a plurality of grooves on a bottom face; removably placing the first roller board within a first housing configured to receive a top face of the first roller board, the top face opposing the bottom face; removably coupling the first housing with the first roller board, through an opening in the first housing, with a first coupler; forming a second roller board having a plurality of grooves on a top face; removably placing the second roller board within a second housing configured to receive a bottom face of the second roller board, the bottom face opposing the top face; and coupling the first housing and the second housing together.

Implementations of methods of manufacture for roller board assemblies may include one, all, or any of the following:

The method may further include removably coupling the second housing with the second roller board, through an opening in the second housing, with a second coupler.

The method may further include forming the first housing and first roller board from a translucent material.

The method may further include providing a third roller board having a plurality of grooves on a bottom face and providing a fourth roller board having a plurality of grooves on a top face, the plurality of grooves on the bottom face of the third roller board and plurality of grooves on the top face of the fourth roller board different from the plurality of grooves of the first roller board and the plurality of grooves of the second roller board, respectively.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation of the disclosed roller board assemblies and related methods and/or assembly procedures for roller board assemblies will become apparent for use with particular implementations from this disclosure. Accordingly, for example, although particular implementations are disclosed, such implementations and implementing components may comprise any shape, size, style, type, model, version, measurement, concentration, material, quantity, implementing components and/or the like as is known in the art consistent with the intended operation of the disclosed roller board assemblies and related methods.

Figure 1:
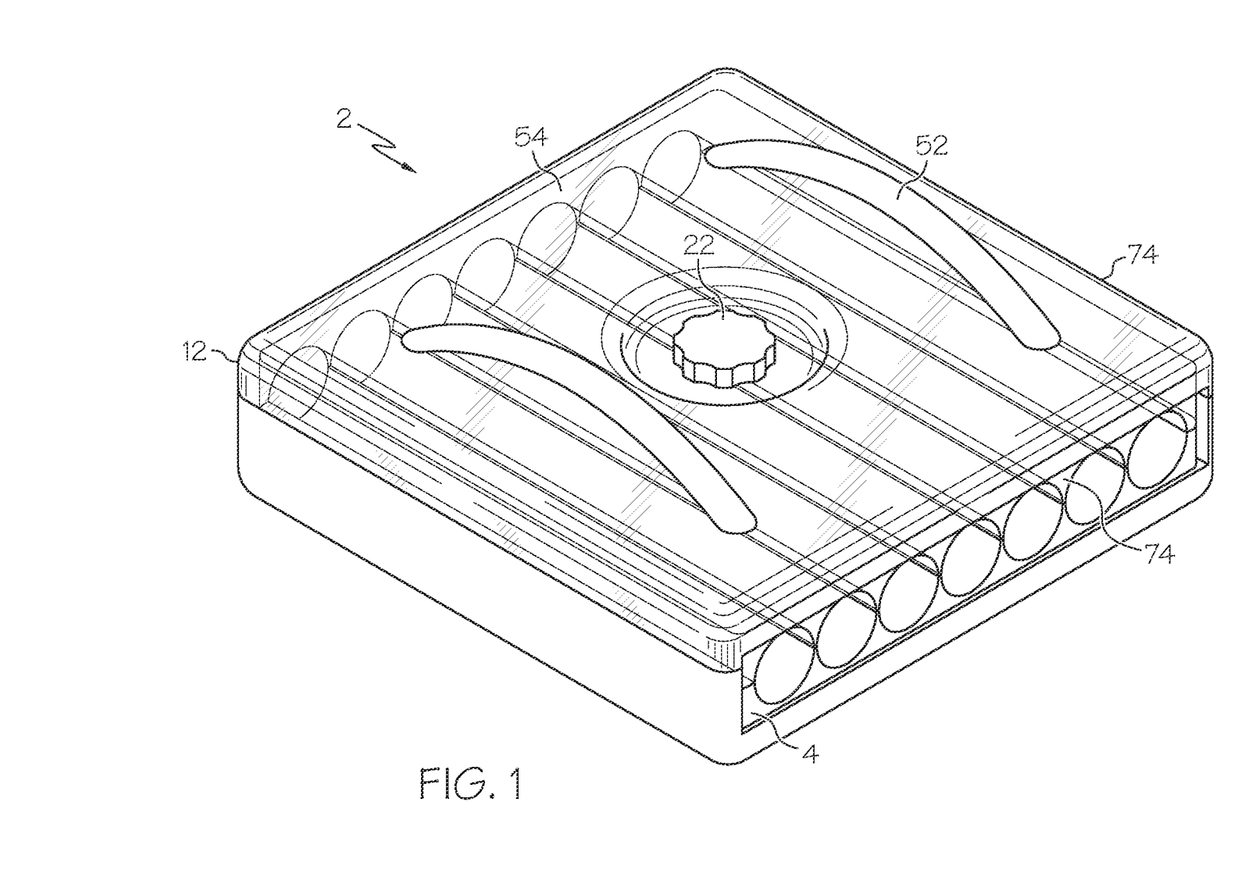
FIG. 1 is a perspective view of an implementation of a roller board assembly.
Figure 2:
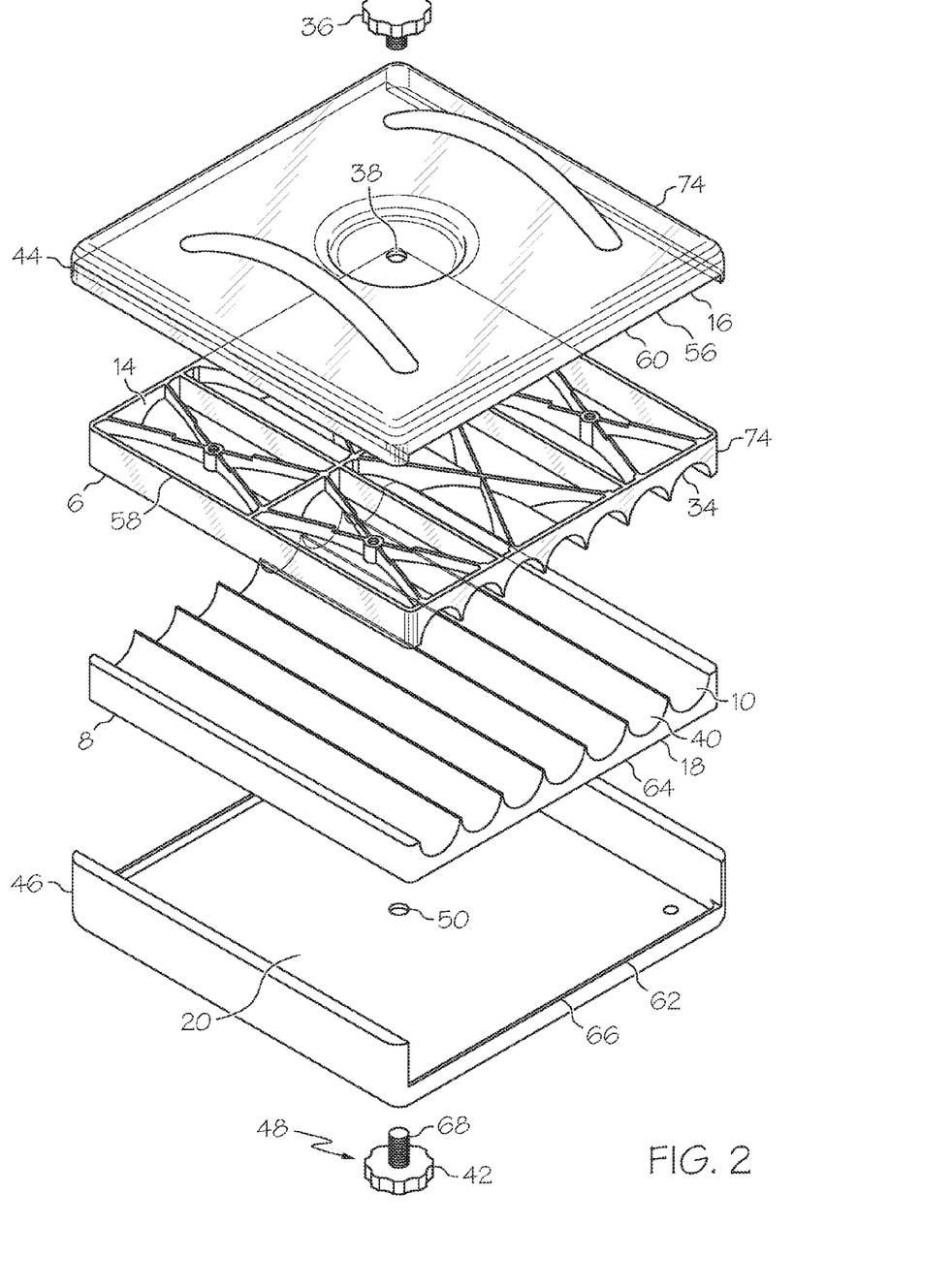
FIG. 2 is a an exploded view of the roller board assembly of FIG. 1.

Referring now to FIGS. 1 and 2, in implementations a roller board assembly 2 includes a roller board 4. The roller board 4 in some implementations includes a first roller board (first roller board insert) 6 and a second roller board (second roller board insert) 8, although in other implementations the roller board 4 could consist of only a single roller board, and in some implementations the roller board 4 could consist of only a single roller board type. The first roller board 6 and second roller board 8 are coupled to a housing 12, and both the first roller board 6 and second roller board 8 include a plurality of grooves 10. In particular implementations, the grooves 10 may have surface texturing and/or roughness to enable the grooves 10 to properly engage the item(s) during rolling. The housing 12 includes a first housing 44 and a second housing 46 which are coupled with the first roller board 6 and second roller board 8, respectively. In various implementations, and as illustrated, the grooves 10 of the first roller board 6 and second roller board 8 are aligned so as to be parallel and facing one another. The grooves 10 may be utilized to create comestibles of various shapes and sizes. For instance, a length of material (dough, batter, mix, paste, etc.) may be placed lengthwise across several of the grooves 10, or otherwise deposited on or in one or more grooves 10, and by bringing the first roller board 6 and second roller board 8 into contact with one another such as in the configuration shown in FIG. 1, then sliding the first roller board 6 and second roller board 8 relative to one another back and forth along a direction parallel with the longest length of the grooves 10, the length of material may be formed into a plurality of balls or shapes of desirable sizes and configurations. The material that is shaped may be any comestible or inedible composition with appropriate plasticity such that it lends itself to being formed in this manner. Particular implementations of roller board assemblies like those disclosed in this document may be utilized to produce comestibles known in the art as cake pops.

Referring now to FIG. 2, in implementations the first roller board 6 has a first face (top face) 14 which the housing 12 is configured to receive at a first side 16 of the first housing 44. The first roller board 6 has a bottom face 34 which opposes the top face 14 and is the side of the first roller board 6 on which the grooves 10 are located. The second roller board 8 has a first face (bottom face) 18 which the housing 12 is configured to receive at a second side 20 of the second housing 46. The second roller board 8 has a top face 40 which opposes the bottom face 18 and is the side of the second roller board 8 on which the grooves 10 are located. Referring now to FIGS. 1 and 2, a coupler 22 is used to couple the housing 12 to the first roller board 6 through an opening 38 in the housing 12. A coupler 22 also, in particular implementations, may couple the housing 12 to the second roller board 8. The coupler 22 may be inserted into a brass or other type of fitting located in or around the opening 38 in the housing 12.

In some implementations the first roller board 6 has a plurality of depressions and/or cavities on its top face 14 which couple with projections on the first side 16 of the first housing 44. In some implementations there are four depressions and/or cavities, one located at each corner of the top face 14. In some implementations the bottom face 18 of the second roller board 8 likewise has a plurality of depressions and/or cavities which couple with projections on the second side 20 of the second housing 46. In some implementations there are four depressions and/or cavities, one located at each corner of the top face 40. These depressions and/or cavities and projections may assist in lining up the roller board 4 with the housing 12 during assembly and also may discourage or prevent movement of the roller board 4 relative to the housing 12 once the roller board assembly 2 is assembled. In implementations the first roller board 6 has reinforcing ribs on its top face 14 and the second roller board 8 has reinforcing ribs on its bottom face 18. The reinforcing ribs may provide structural rigidity.

Referring still to FIGS. 1 and 2, in various implementations, the coupler 22 includes a first coupler 36 which couples the first housing 44 to the first roller board 6 through opening 38 in the first housing 44. In implementations the coupler 22 includes a second coupler 48 which couples the second housing 46 to the second roller board 8 through an opening 50 in the second housing 46, though in other implementations the coupler 22 may not include a second coupler 48 and the second roller board 8 may be held to the second housing 46 merely by gravity, mechanical retention, or another mechanism other than a coupler 22. The coupler 22 may be inserted into a brass or other type of fitting located in or around the opening 50 in the second housing 46. In implementations that include both a first coupler 36 and a second coupler 48 the couplers 22 may be identical, similar, or dissimilar. In the implementations shown in FIG. 2 they are identical. Both couplers 22 include a knob 42 and a screw 68. The knob 42 is used to turn the screw 68, and the first roller board 6 and second roller board 8 may each have a receiving portion (not shown), that includes corresponding threads, configured to receive the screw 68 and facilitate the coupling of the housing 12 to the roller board 4. In other implementations the coupler 22 could couple the housing 12 to the roller board 4 in some other way than that described above, such as by a snap technique, a slot, a friction fit, and the like, and in particular implementations may not require an opening 38 in the first housing 44 and/or an opening 50 in the second housing 46 in order to facilitate the coupling (as in the case of magnetic coupling).

Referring still to FIGS. 1 and 2, in implementations the roller board assembly 2 includes a grip portion allowing a user to handle and move the roller board assembly as desired. In FIGS. 1 and 2 the grip portion includes two handles 52 located on a top face 54 of the first housing 44 that a user may hold while moving the first roller board 6 relative to the second roller board 8 during use. In other implementations the grip portion could include something different than handles 52, such as a rough surface on the top and/or side of the housing 12, or a slot or shape configured to receive fingers or a hand or portion of a hand in or on the housing 12, or some other element configured to engage with the user's body. In implementations each handle 52 is coupled to the first housing 44 by a set of screws located, respectively, at distal ends of the handle 52. In other implementations the handle 52 may be integrally formed as a part of the first housing 44 and in still other implementations the handle 52 may be formed separately from the first housing 44 and attached by glue, mechanical retention such as a friction fit or a clip, or another mechanism.

In implementations the roller board assembly 12 may also include one or more elements or features apart from a coupler 22 that is utilized to further hold the roller board 4 in place while an item is rolled or shaped and/or while the roller board assembly 12 is being assembled. Referring to FIG. 2, in various implementations the first housing includes a first lip 56. The first lip 56 extends downward from the first housing 44 towards the first roller board 6 and is located along a perimeter 60 of the first housing 44. The first lip 56 at least partially engages a perimeter 58 of the first roller board 6, thereby at least partially retaining it and preventing its rotation and slidable movement while the coupler 22 is put into place to couple the first housing 44 to the first roller board 6. The first lip 56 may also prevent the first roller board 6 from slidably moving relative to the first housing 44 while the roller board assembly 2 is being used to roll or shape an item.

In various implementations the second housing 46 may also include a second lip 62 which may function similarly to the first lip 56, though in some implementations the first lip 56 and/or second lip 62 may be absent. The second lip 62 extends upward from the second housing 46 towards the second roller board 8 and is located along a perimeter 66 of the second housing 46. The second lip 62 at least partially engages a perimeter 64 of the second roller board 8, thereby at least partially retaining the second roller board 8 by preventing its rotation while the coupler 22 is put into place to couple the second housing 46 to the second roller board 8. The second lip 62 may also function by preventing the second roller board 8 from slidably moving relative to the second housing 46 while the roller board assembly 2 is being used to roll or shape an item.

In some implementations, in addition to or instead of a first lip 56 the first housing 44 has a clip that holds the first roller board 6 in place. In some implementations, in addition to or instead of a second lip 62 the second housing 46 has a clip that holds the second roller board 8 in place.

The roller board assembly 2 may be configured such that the roller board 4 may be removed or uncoupled from the housing 12 and replaced by or exchanged with another roller board 4. In this way, roller boards 4 having grooves 10 of various sizes and shapes may be utilized with a roller board assembly 2.

Figure 3:
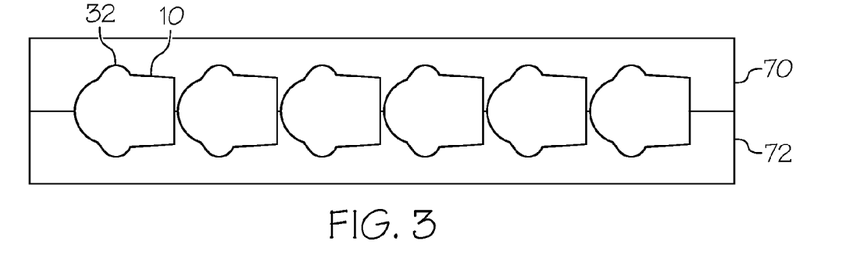
FIG. 3 is a front view of an implementation of a roller board.

Referring now to FIG. 3, in a particular implementation a roller board 4 may have grooves 10 which have a cross-sectional shape of half of a cupcake shape 32. When the grooves 10 of the first roller board 6 each have half of a cupcake shape 32 and the grooves 10 of the second roller board 8 also each have half of a cupcake shape 32, the roller board assembly 2 may produce an item formed into the three-dimensional shape of a full cupcake. While a roller board 4 utilizing a cupcake shape may have any size or shape that may resemble a cupcake shape, in one implementation the grooves 10 may have all of the following: a rounded shape forming an edge of the cupcake shape having a radius of 0.19 inches; a first width perpendicular to the bottom face 18 (or top face 14) of about 0.63 inches; a first height parallel with the bottom face 18 (or top face 14) of about 1.38 inches; a second width perpendicular to the bottom face 18 (or top face 14) of about 0.44 inches, and; an angle relative to the bottom face 18 (or top face 14), corresponding with a lower portion of the cupcake, of about 3 degrees. In this implementation there are a total of six grooves 10.

Figure 4:
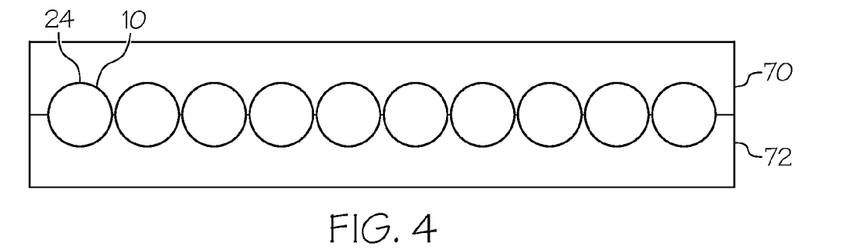
FIG. 4 is a front view of another implementation of a roller board.
Figure 6:
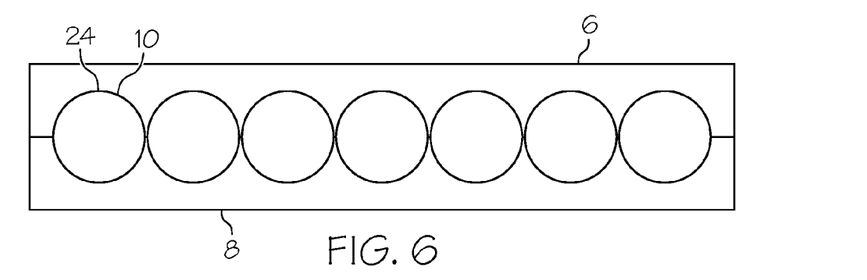
FIG. 6 is a front view of another implementation of a roller board.
Figure 10:
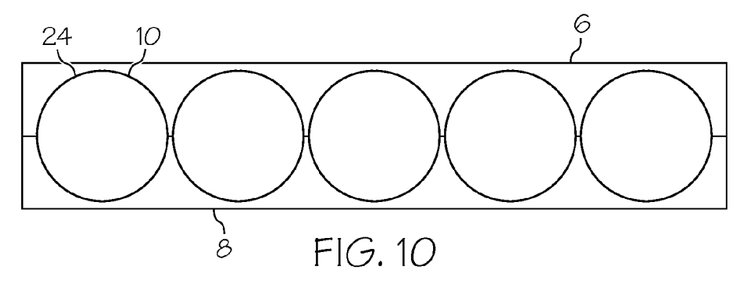
FIG. 10 is a front view of another implementation of a roller board.

Referring now to FIG. 4, in implementations a roller board 4 may have grooves 10 which have a half circle 24 shape, i.e., the grooves 10 of the first roller board 6 each have a half circle 24 shape and the grooves 10 of the second roller board 8 also each have a half circle 24 shape, thus when the roller board assembly 2 is utilized by a user to roll an item, the item to be rolled may be formed into the shape of a full circle or, in other words, a three-dimensional sphere. While many sized circles are possible, in one implementation the half circle 24 shaped grooves 10 have a radius of about 0.44 inches. In this implementation there are ten grooves 10 and the roller board 4 has a length perpendicular to the grooves 10 and parallel with the bottom face 18 (or top face 14) of the roller board 4 of about 9.75 inches. Referring now to FIG. 6, in another implementation the grooves 10 have a radius of about 0.63 inches, and there are seven grooves 10. Referring now to FIG. 10, in other implementations the grooves 10 have a radius of 0.875 inches in order to form a 1.75 inch ball. In these implementations there are five grooves 10. In other implementations the grooves 10 have a radius of 0.66 inches, the roller board 4 has ridges separating each groove 10 which have a minimum thickness in a direction perpendicular to the grooves 10 and parallel with the bottom face 18 (or top face 14) of about 0.05 inches, and a distance between ridges in the same direction of about 1.25 inches. In other implementations the grooves 10 have a radius of about 0.47 inches and a distance between the ridges in the said direction of about 0.88 inches, and there are ten grooves 10.

Figure 5:
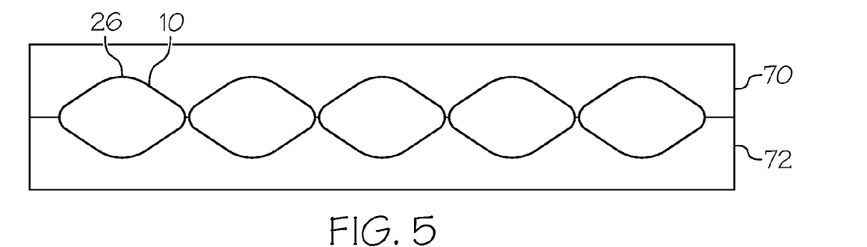
FIG. 5 is a front view of another implementation of a roller board.

Referring now to FIG. 5, in particular implementations a roller board 4 may have grooves 10 which have half an oval shape 26, i.e., each of the grooves 10 of the first roller board 6 has a cross-sectional shape that is half of an oval shape 26 and each of the grooves 10 of the second roller board 8 has a corresponding half an oval shape 26, thus when the roller board assembly 2 is utilized by a user to roll an item, the item to be rolled may be formed into a full oval shape. While various shapes and sizes resembling an oval may be used, in one implementation the grooves 10 have a radius of about 0.55 inches at the center of each groove 10, two sides of each groove 10 form an angle of about 113.10 degrees, and each groove 10 has a width, perpendicular to the bottom face 18 (or top face 14) of about 0.55 inches. In this implementation there are five grooves 10. In implementations each groove 10 has a length perpendicular to the groove 10 but parallel with the bottom face 18 (or top face 14), i.e., the distance between ridges separating each groove, of about 1.75 inches, and the aforementioned sides of each groove 10 form an angle with the bottom face 18 (or top face 14) of about 213.41 degrees.

Figure 7:
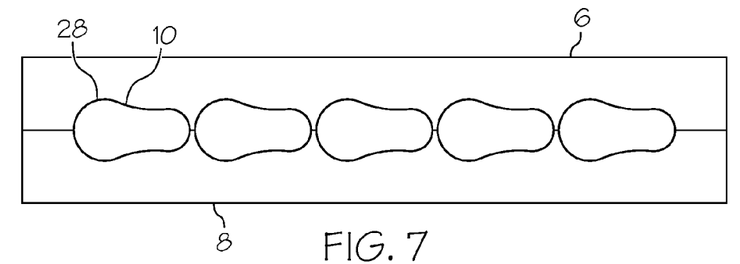
FIG. 7 is a front view of another implementation of a roller board.

Referring now to FIG. 7, in implementations a roller board 4 may have grooves 10 with a cross-sectional shape which is half a pear shape 28, i.e., each of the grooves 10 of the first roller board 6 has a half pear shape 28 and each of the grooves 10 of the second roller board 8 has a half pear shape 28, thus when the roller board assembly 2 is utilized by a user to roll an item, the item to be rolled may be formed into a full pear shape. While various sizes and shapes resembling a pear may be used, in one implementation the grooves 10 have: a first radius of about 0.42 inches configured to form the pear's bottom portion; a second radius opposite in direction of the first radius, configured to form the pear's midsection, of about 1.50 inches; a third radius, similar in direction to the first radius, configured to form the pear's top portion, of about 0.28 inches; a maximum width, corresponding with the pear's bottom portion and perpendicular to the bottom face 18 (or top face 14), of about 0.42 inches; and a minimum width, corresponding with the pear's top portion and perpendicular to the bottom face 18 (or top face 14), of about 0.28 inches. In this implementation there are five grooves 10.

Figure 8:
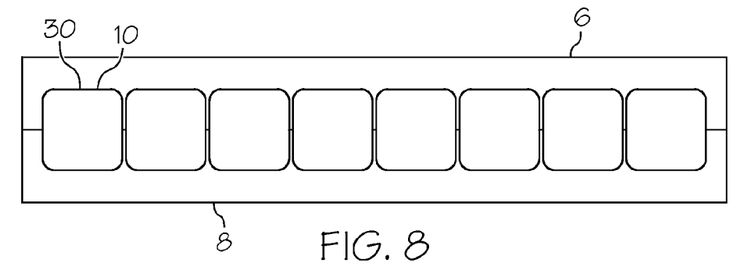
FIG. 8 is a front view of another implementation of a roller board.

Referring now to FIG. 8, in particular implementations a roller board 4 may have grooves 10 which have a cross-sectional shape of half a square shape 30, i.e., each of the grooves 10 of the first roller board 6 has a half square shape 30 and each of the grooves 10 of the second roller board 8 has a half square shape 30, thus when the roller board assembly 2 is utilized to roll an item, the item may be formed into a full cube shape or a full cylindrical shape. While various sizes and shapes using a half square shape 30 may be used, in one implementation the grooves have a width perpendicular to the bottom face 18 (or top face 14) of about 0.55 inches and a length parallel with the bottom face 18 (or top face 14) of about 1.10 inch, and each groove 10 has two radii of about 0.15 inches at corners of the half square shape 30. In this implementation there are eight grooves 10.

Figure 9:
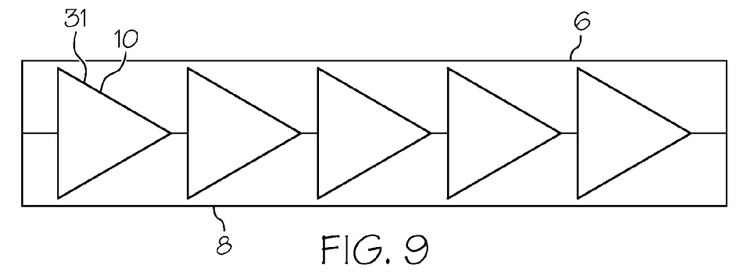
FIG. 9 is a front view of another implementation of a roller board.

Referring now to FIG. 9, in particular implementations a roller board 4 may have grooves 10 which have a cross-sectional shape of half a cone shape 31, i.e., each of the grooves 10 of the first roller board 6 has a half cone shape and each of the grooves 10 of the second roller board 8 has a half cone shape, thus when the roller board assembly 2 is utilized to roll an item, the item may be formed into a full cone shape. While various sizes and shapes using a half square shape 30 may be used, in one implementation the grooves 10 have a length parallel with the bottom face 18 (or top face 14) and perpendicular to the grooves 10 of about 1.75 inch. In this implementation there are five grooves 10.

Referring to FIG. 10, an implementation of a roller board 4 may have grooves 10 which have a cross-sectional shape of half a circle 24, and which have a diameter parallel with the bottom face 18 (or top face 14) and perpendicular to the grooves 10 of about 1.75 inch. In this implementation there are also five grooves 10.

In other implementations the grooves 10 are shaped such that the roller board assembly 2 produces one or more of the following shapes of the item to be rolled: a 0.875 inch diameter ball; a 1.25 inch diameter ball; a 1.5 inch diameter ball; and a 1.75 inch diameter ball. The grooves 10 may be configured to form various other shapes.

In implementations the second housing 46 may have a receptacle at each of the corners of its bottom face, each the receptacles configured to receive a non-slip element. The non-slip element may be secured to the receptacle with glue or by a friction fit or other mechanism. The non-slip element is configured to discourage the second housing 46 from moving relative to the surface which it is resting on while the roller board assembly 2 is being used to roll an item. In some implementations the non-slip element may be coupled directly to the bottom face of the second housing 46 without the use of a receptacle. The non-slip element in some implementations comprises a piece of rubber.

In implementations the housing 12 has a length perpendicular to the grooves 10 of about 10.50 inches, a length parallel to the grooves 10 of about 11.87 inches, a height from the bottom of the non-slip elements to the top of the handles 52 of about 4.39 inches, and a height from the bottom of the non-slip elements to the top face 54 of the first housing 44 of about 3.22 inches. In implementations each roller board insert has a height from its bottom face 18 (or top face 14) perpendicular to the grooves 10, of about 1 inch, a length perpendicular to the grooves 10 and parallel with its bottom face 18 (or top face 14) of about 11.25 inches, and a length parallel to the grooves 10 and parallel with the bottom face 18 (or top face 14) of about 9.75 inches. Other implementations have a length perpendicular to the grooves 10 and parallel with its bottom face 18 (or top face 14) of about 9.75 inches and a length parallel to the grooves 10 and parallel with the bottom face 18 (or top face 14) of about 10.20 inches. In implementations the roller board 4 has ridges separating each groove 10 which have a minimum thickness in a direction perpendicular to the grooves 10 and parallel with the bottom face 18 (or top face 14) of about 0.05 inches. Other implementations may have some of these dimensions within 1-2 inches of the specific values listed herein, and other implementations may have dimensions outside of that range. In implementations the roller board assembly 2 is configured to fit within a 12 inch by 12 inch by 5.5 inch box.

Many additional roller board implementations are possible using the principles disclosed in this document.

In the implementations disclosed herein the roller board assemblies 2 may be made of high density polyethylene (HDPE), but in other implementations the roller board assemblies may comprise other polymeric materials or composite materials (natural such as wood, or man-made composites), metals (such as steel), ceramics, and/or other materials, and any combination thereof. In particular implementations, the upper housing and first roller board insert may be made of a clear or transparent plastic material 74. In these implementations, the user may be able to view the items being formed to know when they are completed as well as ensure they remain within the roller board during shaping and do not prematurely exit the grooves. In some implementations the lower housing and second roller board insert may also be made of a clear or transparent plastic material.

Implementations of roller board assemblies like those disclosed in this document may utilize implementations of a method of forming a roller board assembly. Implementations of the method may include forming a first roller board including a plurality of grooves in (on) a bottom face and removably placing the first roller board within a first housing configured to receive a top face of the first roller board where the top face opposes the bottom face. The method also includes removably coupling the first housing with the first roller board through an opening in the first housing with a first coupler and forming a second roller board having a plurality of grooves on a top face. The method also includes removably placing the second roller board within a second housing configured to receive a bottom face of the second roller board where the bottom face opposes the top face and coupling the first housing and the second housing together. In various implementations of the method, the method may further include exchanging the first roller board and the second roller board with a third roller board 70 and a fourth roller board 72 with grooves different from the first roller board and second roller board, respectively. In addition, particular implementations of the method may include forming the first housing and the first roller board from a translucent material.

Implementations of roller board assemblies may also be utilized in implementations of a method of rolling out items. The method includes rolling comestible material into a four-sided frame where each side of the frame has a desired height above a surface on which the frame is resting. Once the comestible material has filled the frame and is level with the top of each side of the frame, the frame is removed, and the rolled out comestible material is placed on top of the second roller board (the first roller board having been removed already). The first roller board is then placed on top of the comestible material and pressed downwardly toward the second roller board. Because the grooves in the first roller board and second roller board are aligned, the grooves cut through the comestible material, separating it into a plurality of strips each with a width approximately that of the width of each groove. The first roller board is then removed and the strips of comestible material are removed from each groove. One or more of the strips are then laid approximately perpendicular across the plurality of grooves and the first roller board is placed over the comestible material and pressed down while being slid across the surface of the second roller board. A desired number of back and forth motions with the first roller board may be utilized to produce a plurality of items from the one or more strips that have taken on the shape of the grooves.

In places where the description above refers to particular implementations of a roller board assembly, it should be readily apparent that a number of modifications may be made without departing from the spirit thereof and that these implementations may be applied to other roller board assemblies.

The invention claimed is:
1. A roller board assembly, comprising:
a roller board comprising a first roller board insert and a second roller board insert, the first roller board insert and second roller board insert each comprising a plurality of grooves, wherein each of the grooves comprises a substantially constant cross section along substantially an entire length of the groove, the plurality of grooves of the first roller board insert and the plurality of grooves of the second roller board insert aligned parallel with and facing each other;
wherein the roller board is removably coupled within a housing, the housing receiving a first face of the first roller board insert on a first side of the housing and receiving a first face of the second roller board insert on a second side of the housing, wherein the first face of the first roller board insert is a top face, the plurality of grooves of the first roller board insert are comprises on a bottom face of the first roller board insert located on a side of the first roller board insert opposing the top face, and wherein the housing contacts a majority of the top face; and
at least one coupler coupling the roller board to the housing through an opening in the housing.

2. The roller board assembly of claim 1, wherein the substantially constant cross section of each of the plurality of grooves taken perpendicular to the plurality of grooves comprises one of half of a pear shape, half of an oval shape and half of a cupcake shape.

3. The roller board assembly of claim 1, wherein the roller board assembly is configured to be hand held and hand operated.

4. The roller board assembly of claim 1, wherein the roller board assembly is configured such that the first side of the housing and the second side of the housing contact one another during a rolling operation.

5. The roller board assembly of claim1, wherein the first roller board insert and second roller board insert are coupled together by gravity.

6. The roller board assembly of claim 1, wherein each of the grooves comprises a constant cross section along substantially the entire length of the groove.

7. A roller board assembly, comprising:
a first roller board comprising a plurality of grooves on a bottom face of the first roller board;
a first housing receiving and contacting a majority of a top face of the first roller board, the top face of the first roller board located on a side of the first roller board opposing the bottom face;
a first coupler removably coupling the first roller board to the first housing through an opening in the first housing;
a second roller board comprising a plurality of grooves on a top face of the second roller board;
a second housing coupled to the first housing and receiving a bottom face of the second roller board, the bottom face of the second roller board located on a side of the second roller board opposing the top face of the second roller board; and
a second coupler removably coupling the second roller board to the second housing through an opening in the second housing.

8. The roller board assembly of claim 7, wherein the first housing comprises one or more handles on a top face of the first housing.

9. The roller board assembly of claim 7, wherein the first housing comprises a first lip configured to prevent a sliding motion of the first roller board relative to the first housing, the first lip located along a perimeter of the first housing and the first lip facing the first roller board, and wherein the second housing comprises a second lip configured to prevent a sliding motion of the second roller board relative to the second housing, the second lip located along a perimeter of the second housing and the second lip facing the second roller board.

10. The roller board assembly of claim 7, wherein the first coupler comprises a knob and screw inserted into the opening in the first housing, the opening in the first housing residing in a recess of the first housing, and the second coupler comprises a knob and screw inserted into the opening in the second housing.

11. The roller board assembly of claim 7, wherein a cross section of each groove of the first roller board and second roller board comprises a shape of one half of a cupcake.

12. The roller board assembly of claim 7, wherein a cross section of each groove of the first roller board and second roller board comprises a shape of one half of an oval.

13. The roller board assembly of claim 7, wherein a cross section of each groove of the first roller board and second roller board comprises a shape of one half of a pear.

14. The roller board assembly of claim 7, wherein the first housing and the second housing are configured to selectively contact one another by a manual lowering of the first housing by a user when the plurality of grooves of the first roller board are aligned with the plurality of grooves of the second roller board.

15. The roller board assembly of claim 7, wherein each groove of the first roller board and second roller board comprises a constant cross section along substantially the entire length of the groove.

16. The roller board assembly of claim 7, further comprising a plurality of ridges, each ridge comprised in one of the first roller board and the second roller board between two of the grooves, wherein each ridge comprises a constant cross section along substantially the entire length of the ridge.

17. A method of use of a roller board assembly, comprising:
providing a first roller board having a plurality of grooves on a bottom face, wherein each of the grooves has substantially constant cross section along substantially the entire length of the groove;
removably placing the first roller board within a first housing configured to receive a top face of the first roller board, and contacting a majority of the top face with the first housing, the top face opposing the bottom face;
removably coupling the first housing with the first roller board, through an opening in the first housing, with a first coupler;
providing a second roller board having a plurality of grooves on a top face, wherein each of the grooves has a substantially constant cross section along substantially the entire length of the groove;
removably placing the second roller board within a second housing configured to receive a bottom face of the second roller board, the bottom face opposing the top face, of the second roller board;
removably coupling the second housing with the second roller board, through an opening in the second housing, with a second coupler;
contacting the first housing with the second housing by manually lowering the first housing such that the plurality of grooves of the first roller board are aligned with the plurality of grooves of the second roller board; and
while contacting the first housing with the second housing, manually sliding the first roller board relative to the second roller board while maintaining alignment of the grooves of the first roller board and the grooves of the second roller board.

18. The method of claim 17, further comprising removing the first roller board from within the first housing and replacing the first roller board with a third roller board having a plurality of grooves on a bottom face and removing the second roller board within the second housing and replacing the second roller board with a fourth roller board having a plurality of grooves on a top face, the plurality of grooves on the bottom face of the third roller board and plurality of grooves on the top face of the fourth roller board shaped differently than the plurality of grooves of the first roller board and the plurality of grooves of the second roller board, respectively.

19. The method of claim 17, further comprising removing the first housing from contact with the second housing by manually lifting the first housing.

20. The method of claim 17, further comprising observing a rolling operation of a food item through a transparent portion of the roller board assembly.

* * * * *